(12) United States Patent
Gerber et al.

(10) Patent No.: US 6,707,965 B2
(45) Date of Patent: Mar. 16, 2004

(54) POLARIZATION CONTROLLING OPTICS IN FIBER COLLIMATOR ASSEMBLIES

(75) Inventors: Ronald E. Gerber, Richfield, MN (US); Shubhagat Gangopadhyay, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 101 days.

(21) Appl. No.: 10/137,844

(22) Filed: May 1, 2002

(65) Prior Publication Data

US 2003/0206695 A1 Nov. 6, 2003

(51) Int. Cl.[7] .................................................. G02B 6/32
(52) U.S. Cl. ............................ 385/33; 385/11; 385/24
(58) Field of Search .............................. 385/33, 16, 11, 385/24, 2, 14, 7; 372/6

(56) References Cited

U.S. PATENT DOCUMENTS 6,532,321 B1 * 3/2003 Zhang et al. .................. 385/27

* cited by examiner

Primary Examiner—Phan T. H. Palmer
(74) Attorney, Agent, or Firm—Altera Law Group, LLC

(57) ABSTRACT

A fiber collimator device includes polarization controlling optics to simplify the manufacture of fiber collimators that use polarization maintaining fiber. In particular, the use of the polarization control optics in a fiber collimator reduces the need to align the polarization axis of the polarization maintaining fiber, thus reducing the time spent on fabricating the device. This is useful where the collimation device includes a polarization mode combiner.

17 Claims, 3 Drawing Sheets

POLARIZATION CONTROLLING OPTICS IN FIBER COLLIMATOR ASSEMBLIES

FIELD OF THE INVENTION

The present invention is directed generally to fiber optic devices, and more particularly to single and dual-fiber collimators utilizing polarization-maintaining fibers.

BACKGROUND

In the field of fiber optic communications, information is transmitted optically over a network of single-mode or multi-mode fibers. Many of the switching and splitting functions in these networks are accomplished in free space, where the light may exit the fiber and interact with active and/or passive optical components. In some instances, it may be necessary to collimate the optical beam exiting the fiber for efficient interaction with the external components. Also, the transmitter unit in fiber optic communication systems is typically a semiconductor laser diode, which has a linearly polarized output which may be coupled to a polarization-maintaining fiber.

When preparing a break in an optical communication link, it is common to insert the exposed fiber optic into an optical ferrule for protection of the delicate glass fiber. There are applications where it may be desirable to have two or more such fibers in the same ferrule transmitting and/or receiving at different optical wavelengths, or at the same wavelength.

Given the above, there is a need for an optical collimating device incorporating a multi-port ferrule which can accommodate an input optical signal carried by a polarization maintaining fiber.

SUMMARY OF THE INVENTION

Generally, the present invention relates to a fiber collimator device that includes polarization controlling optics to simplify the manufacture of fiber collimators that use polarization maintaining fiber. In particular, the use of the polarization control optics in a fiber collimator reduces the need to align the polarization axis of the polarization maintaining fiber, thus reducing the time spent on fabricating the device.

In particular, one embodiment of the invention is directed to a fiber collimator unit having a first focusing element having an optical axis and a first focal length. A first optical fiber is optically coupled to a first side of the first focusing element, and is disposed at a first transverse distance from the optical axis so that light from the first optical fiber propagates on a second side of the first focusing element as a substantially collimated beam at a first angle to the optical axis. A first polarization rotator is disposed on the second side of the first focusing element. The polarization rotator deviates the polarization state of the substantially collimated beam. There is an optical element that substantially redirects light at a first pre-determined polarization state and substantially transmits light at a second pre-determined polarization state orthogonal to the first polarization state.

Another embodiment of the invention is directed to a method of aligning light in a fiber optic device. The method includes transmitting a first polarized light from a first port disposed towards a first end of the device through a polarization rotator and adjusting the polarization of the first output light to a selected state by rotating the polarization rotator. The method also includes reflecting light in the selected polarization state back so that the reflected light propagates through the polarization rotator to a second port disposed towards the first end of the device.

Another embodiment of the invention is directed to an optical system that has an optical transmitter producing output light, an optical receiver receiving at least a portion of the output light, and an optical fiber link coupling between the optical transmitter and the optical receiver. At least two light sources have outputs combined in fiber device having a first focusing element having an optical axis and a first focal length. A first optical fiber is optically coupled to a first side of the first focusing element. The first optical fiber is disposed at a first transverse distance from the optical axis so that light from the first optical fiber propagates on a second side of the first focusing element as a substantially collimated beam at a first angle to the optical axis. A first polarization rotator is disposed on the second side of the first focusing element, the polarization rotator deviating the polarization state of the substantially collimated beam. An optical element substantially reflects light at a first predetermined polarization state and substantially transmits light at a second pre-determined polarization state orthogonal to the first polarization state. An output form the fiber device is coupled into the fiber link.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
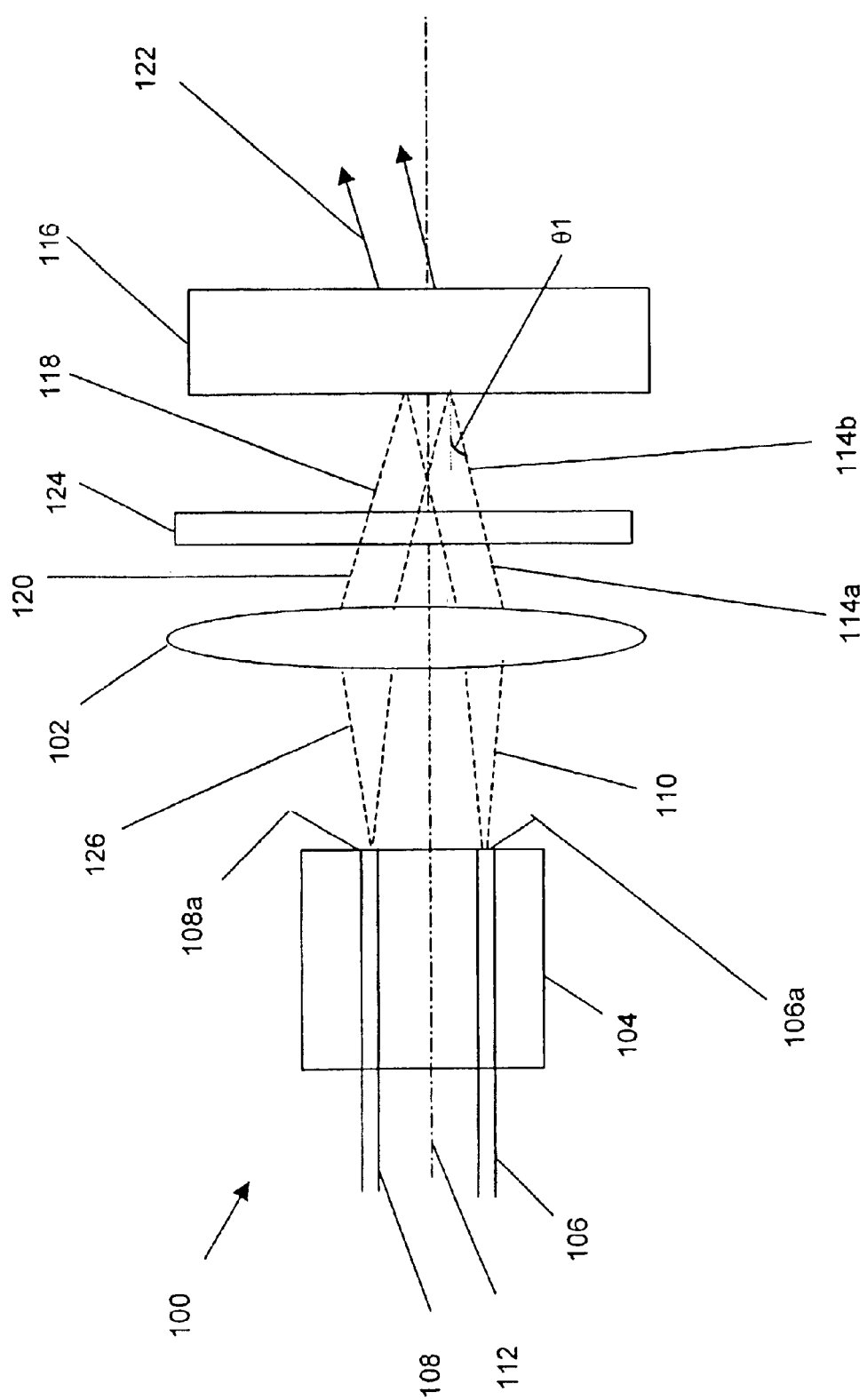
FIG. 1 schematically illustrates a dual-fiber collimator unit.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to fiber optic devices and is believed to be particularly useful with fiber optic devices that use single and dual-fiber collimators utilizing polarization-maintaining fibers.

A dual-fiber collimator (DFC) assembly 100 is an important building block for optical add/drop multiplexers, monitor arrays, and hybrid assemblies. A typical design for a DFC 100 is shown in FIG. 1, which schematically illustrates a dual port, filter-based optical device. The device may be part of a multiplexer/demultiplexer, add/drop filter, power tap, or the like. The dual-fiber collimator 100 includes a first lens 102 and dual-fiber ferrule 104. Two fibers 106 and 108 are held in the ferrule 104, with their ends 106a and 108a positioned at a distance from the lens 102 equal to about the focal length of the lens 102. The ferrule end 104a, and the fiber ends 106a and 108a may be polished at a small angle to prevent reflections feeding to other elements. Fiber 106 may be a polarization maintaining (PM) fiber with a linearly polarized output beam 110, wherein the polarization vector of the beam 110 may project in an arbitrary direction in a plane orthogonal to the direction of propagation.

In the illustrated embodiment, a first linearly polarized light beam 110, from the first fiber 106, passes through the lens 102 and is collimated. However, since the beam 110 is not positioned on the lens axis 112, the collimated beam 114 propagates at an angle, $\theta 1$, relative to the axis 112. For typical systems, the value of $\theta 1$ may be around 2°, depending on such factors as the focal length of the lens 102 and the separation between the two fibers 106 and 108.

The collimated beam 114a is incident on a polarization rotator 124. The polarization rotator 124 may be a retardation waveplate, or other type of optical device that rotates polarization. Here, the term optical waveplate is used to cover optical devices that rotate the polarization of the light, including retardation waveplates and Faraday rotators. The optical waveplate 124 may vary the polarization state of the output beam 114b to any desired linear state, for example by rotating the optical waveplate 124 about the optical axis 112. The optical waveplate 124 may be adjusted such that the output beam 114b is in a desired polarization state when incident on the optical element 116. The optical element 116 may be a single or multiple element optical device designed to substantially reflect light at a pre-determined linear polarization state and to transmit the orthogonal linear polarization as a transmitted beam 122. The optical element 116 may substantially reflect the beam 114b as a collimated reflected beam 118. The reflected beam 118 re-transits the optical waveplate 124 and emerges as beam 120, still linearly polarized but, typically, no longer parallel to the input polarization vector of beam 118. Beam 120 is redirected as beam 126 and focused by lens 102 into the second fiber 108. The second fiber may be a single mode fiber insensitive to the polarization state of beam 126.

An advantage of the embodiment of DFC illustrated in FIG. 1 is that the polarization axis of the polarizing maintaining fiber 106 need not be aligned precisely to deliver light in the desired polarization state for reflection and/or transmission at the optical element 116. Such alignment is labor intensive and, therefore, increases the cost of the device. Instead, the waveplate 124 is used to control the polarization of the light incident on the element 116. Rotating the waveplate 124 to achieve the desired polarization state is simpler than rotating the orientation of the polarization maintaining fiber 106 in the ferrule 104. Furthermore, the polarization of the reflected beam 120 relative to the second fiber 108 may be unimportant, particularly where the second fiber 108 is not a polarization maintaining fiber, and so the polarizing effects of the second passage of the light through the waveplate 124, towards the second fiber 108, may be unimportant.

Figure 2:
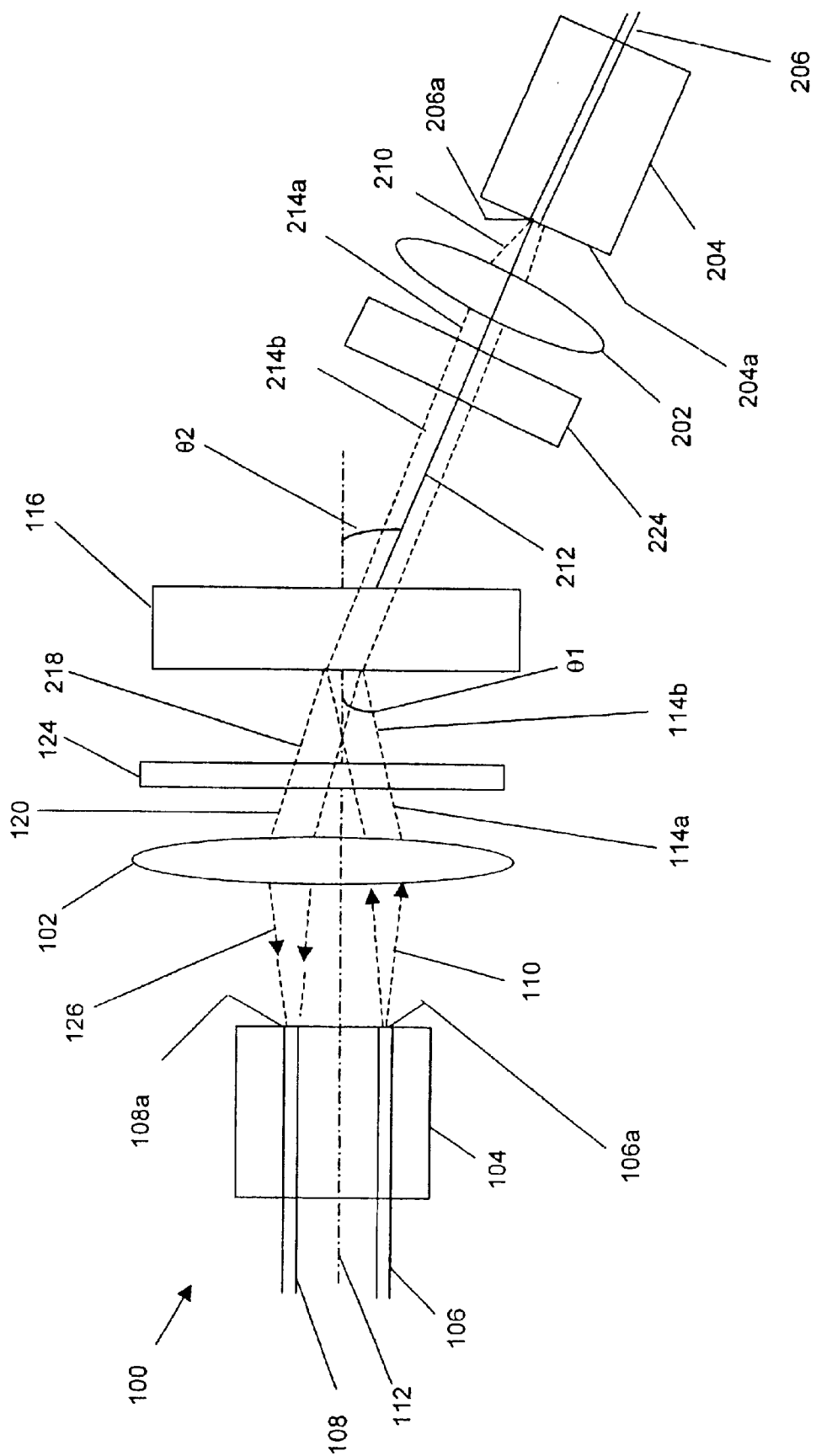
FIG. 2 schematically illustrates another embodiment of a dual-fiber collimator unit.

Another particular embodiment 200 of the invention is illustrated in FIG. 2, which shows a single fiber collimator (SFC) coupling light into one arm, fiber 108, of a dual fiber collimator (DFC). The DFC contains elements substantially identical to those depicted in FIG. 1, and light is coupled from input fiber 106 to output fiber 108 in the manner outlined previously. Light passing from the optical element 116 is denoted, in this case, as beam 218. The portion of light beam 114b that is reflected by the element 116 forms a component of the beam 218.

The single fiber collimator includes a lens 202 and a single-fiber ferrule 204. The SFC has an optical axis 212 that is set at an angle $\theta 2$ relative to optical axis 112 of the DFC. The angle $\theta 2$ may be chosen such that the light transmitted through the element 116 is colinear with the portion of beam 114b reflected from the element 116, and forms another component of optical beam 218. Fiber 206 is held in ferrule 204, with its end 206a positioned at a distance from the lens 202 equal to about the focal length of the lens 202. The ferrule end 204a and the fiber end 206a may be polished at a small angle to prevent reflections feeding to other elements. Fiber 206 may be a polarization maintaining fiber with a linearly polarized output beam 210, wherein the polarization vector of the beam 210 may project in an arbitrary direction in a plane orthogonal to the direction of propagation. In the illustrated embodiment, a linearly polarized light beam 210 from fiber 206 passes through lens 202 and is collimated. The collimated beam 214a is incident on a polarization rotator 224, also referred to as an optical waveplate. Optical waveplate 224 may vary the polarization state of the output beam 214b to any desired linear state by a technique such as rotating the optical waveplate 224 about the axis 212. The optical waveplate may be adjusted such that the output beam 214b is in the appropriate polarization state to be substantially transmitted by optical element 116. The optical beam 214c exits optical element 116 substantially collimated and combines with beam 118 and traverses substantially the same pathway as beams 118, 120 and 126 and is directed by lens 102 and focused into fiber 108.

An advantage of the this embodiment is that the polarization axis of the polarization maintaining fiber 206 need not be aligned relative to the optical element 116. Instead, the optical waveplate 224 may rotated to align the polarization of the light beam 120 to a desired state, for example a polarization state that is transmitted through the optical element 116 to the second fiber 108.

Figure 3:
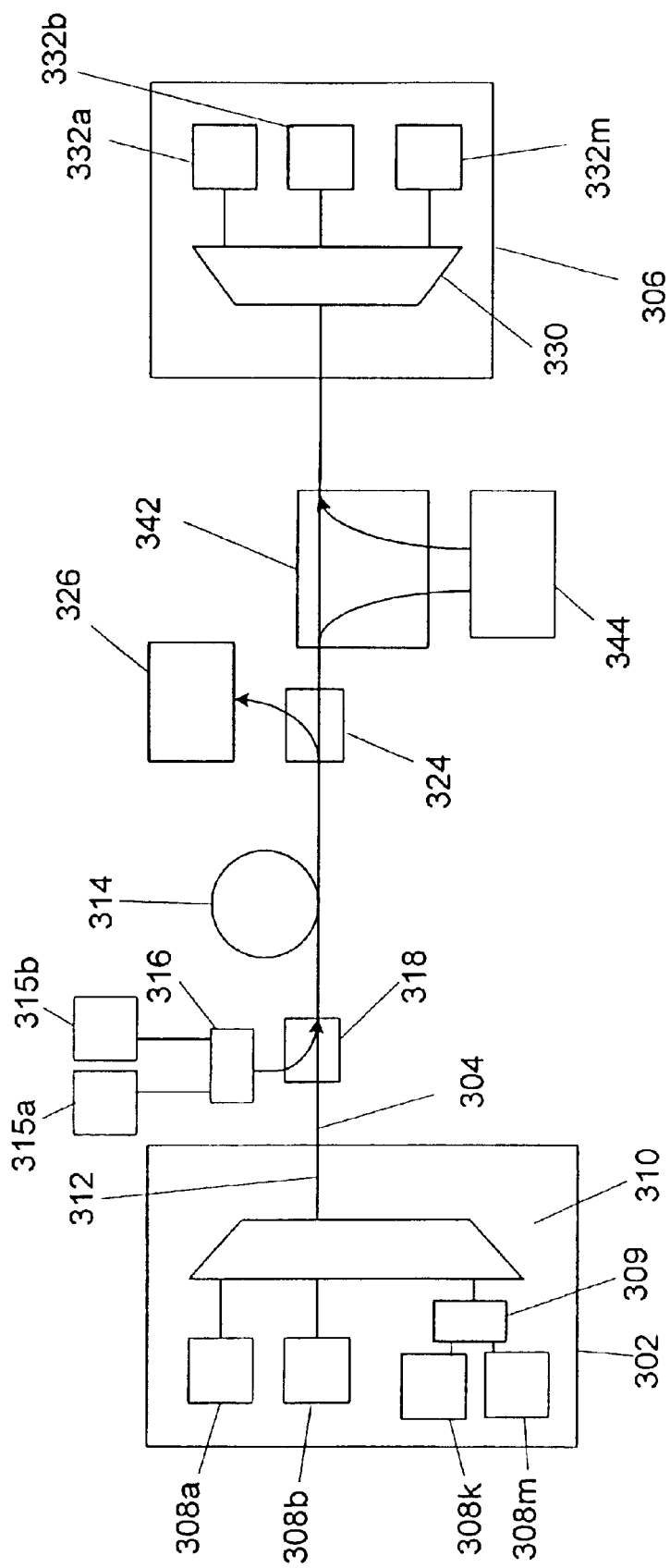
FIG. 3 schematically illustrates an embodiment of an optical communications system according to an embodiment of the invention.

One particular application of the present invention is in polarization mode combining polarized beams from two different sources, for example to combine the output from two lasers. An optical system 300 that uses a polarization mode combiner is schematically illustrated in FIG. 3. A DWDM transmitter 302 directs a DWDM signal having m channels through a fiber communications link 304 to a DWDM receiver 306.

In this particular embodiment of DWDM transmitter 302, a number of light sources 308a, 308b–308m generate light at different wavelengths, $\lambda a, \lambda b \ldots \lambda m$, corresponding to the different optical channels. One or more of the light sources 308a–308m may include two light generators, for example lasers 308m' and 308m", whose output is polarization combined in a polarization mode combiner 316. The wavelengths of the light generators 308m' and 308m" need not be the same. The light output from the light sources 308a–308m is combined in a DWDM combiner unit 310, or multiplexer (MUX) unit to produce a DWDM output 312 propagating along the fiber link 304.

Light sources 308a–308m are typically laser sources whose output is externally modulated, although they may also be modulated laser sources, or the like. It will be appreciated that the DWDM transmitter 302 may be configured in many different ways to produce the DWDM output signal. For example, the MUX unit 310 may include an interleaver to interleave the outputs from different multiplexers. Furthermore, the DWDM transmitter 302 may be equipped with any suitable number of light sources for generating the required number of optical channels. For example, there may be twenty, forty or eighty optical channels, or more. The DWDM transmitter 302 may also be redundantly equipped with additional light sources to replace failed light sources.

Upon reaching the DWDM receiver 306, the DWDM signal is passed through a demultiplexer unit (DMUX) 330, which separates the multiplexed signal into individual channels that are directed to respective detectors 332a, 332b–332m.

The fiber link 304 may include one or more fiber amplifier units 314, for example rare earth-doped fiber amplifiers, Raman fiber amplifiers or a combination of rare earth-doped and Raman fiber amplifiers. The pump light may be introduced to the fiber amplifier 314 from a pump unit having two pump lasers 315a and 315b. The outputs from these two lasers 315a and 315b may be polarization combined in a polarization mode combiner 316 and the combined pump beam coupled into the fiber link 304 via a coupler 318. The wavelengths of the two pump lasers 315a and 315b may be the same, or may be different.

The fiber link 304 may include one or more DWDM channel monitors 326 for monitoring the power in each of the channels propagating along the link 304. Typically, a fraction of the light propagating along the fiber link 304 is coupled out by a tap coupler 324 and directed to the DWDM channel monitor 326. The fiber link 304 may also include one or more gain flattening filters 325, typically positioned after an amplifier unit 314, to make the power spectrum of different channels flat. The channel monitor 326 may optionally direct channel power profile information to the gain flattening filter. The gain flattening filter 325 may, in response to the information received from the channel monitor 326, alter the amount of attenuation of different channels in order to maintain a flat channel power profile, or a channel power profile having a desired profile.

The fiber link 304 may include one or more optical add/drop multiplexers (OADM) 342 for directing one or more channels to a local fiber system 344. The local loop 344 may also direct information back to the OADM 342 for propagating along the fiber link 304 to the DWDM receiver 306. It will be appreciated that the information directed from the local fiber system 344 to the OADM 342 need not be at the same wavelength as the information directed to the local loop 344 from the OADM 342. Furthermore, it will be appreciated that the OADM 342 may direct more than one channel to, and may receive more than one channel from, the local system 344. The amount of light being added to the fiber link 304 from the local system 344 may be monitored by a channel monitor to ensure that the light in the channel (s) being added to the fiber link has an amplitude similar to that of the existing channels.

As noted above, the present invention is applicable to fiber optic devices and is believed to be particularly useful in fiber optic devices that have polarized inputs. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A fiber collimator unit, comprising:
    a first focusing element having an optical axis and a first focal length;
        a first optical fiber optically coupled to a first side of the first focusing element, the first optical fiber being disposed at a first transverse distance from the optical axis so that light from the first optical fiber propagates on a second side of the first focusing element as a substantially collimated beam at a first angle to the optical axis;
        a first polarization rotator disposed on the second side of the first focusing element, the first polarization rotator deviating the polarization state of the substantially collimated beam; and
        an optical element, wherein the optical element substantially redirects light at a first pre-determined polarization state and substantially transmits light at a second pre-determined polarization state orthogonal to the first polarization state.

2. A unit as described in claim 1, further comprising a second focusing element disposed to substantially collimate light received from a third fiber, the substantially second collimated beam from the third fiber propagating in a direction substantially opposite to the light propagating from the first optical fiber.

3. A unit as described in claim 2, wherein a second polarization rotator rotates the polarization state of the second collimated beam from the third fiber such that the second collimated beam exits the second polarization rotator in the second pre-determined polarization state and is transmitted by the optical element.

4. A unit as described in claim 3, wherein the second collimated beam is transmitted through the optical element and is focused into the second fiber by the first focusing element.

5. A unit as recited in claim 1, further comprising a second optical fiber optically coupled to the first side of the first focusing element and disposed at a second transverse distance from the optical axis, on a side of the optical axis opposite the first optical fiber, to receive the light redirected from the optical element and focused by the first focusing element.

6. A unit as described in claim 5, wherein the first and second optical fibers are mounted in a dual-fiber ferrule.

7. A unit as described in claim 1, further comprising a second polarization rotator disposed on a second side of the optical element away from the first focusing element.

8. A method of aligning light in a fiber optic device, the method compromising:
    transmitting a first polarized light from a first port disposed towards a first end of the device through a polarization rotator;
    adjusting the polarization of the first output light to a selected state by rotating the polarization rotator; and
    reflecting light in the selected polarization state back so that the reflected light propagates through the polarization rotator to a second port disposed towards the first end of the device.

9. A method as recited in claim 8, wherein reflecting the light in the selected polarization state includes reflecting the light using a polarization sensitive element that reflects light in a first polarization state and transmits light in a second polarization state orthogonal to the first polarization state, and further comprising propagating a second polarized light through the polarization sensitive element, the second polarized light being polarized orthogonally to the selected polarization state.

10. A method as recited in claim 9, further comprising rotating a second polarization rotator to adjust the polarization of the second polarized light to the second polarization state that is transmitted through the polarization sensitive element.

11. An optical system, comprising:

an optical transmitter producing output light;

an optical receiver receiving at least a portion of the output light; and an optical fiber link coupling between the optical transmitter and the optical receiver, at least two light sources having outputs combined in a fiber device having
- a first focusing element having an optical axis and a first focal length;
- a first optical fiber optically coupled to a first side of the first focusing element, the first optical fiber being disposed at a first transverse distance from the optical axis so that light from the first optical fiber propagates on a second side of the first focusing element as a substantially collimated beam at a first angle to the optical axis;
- a first polarization rotator disposed on the second side of the first focusing element, the polarization rotator deviating the polarization state of the substantially collimated beam; and
- an optical element, wherein the optical element substantially reflects light at a first pre-determined polarization state and substantially transmits light at a second pre-determined polarization state orthogonal to the first polarization state, an output from the fiber device being injected into the optical fiber link.

12. A system as recited in claim 11, further comprising one or more optical amplifier units disposed on the optical fiber link between the optical transmitter and the optical receiver.

13. A system as recited in claim 12, wherein the at least two light sources include two pump lasers, the combined output from the fiber device being coupled to pump a fiber amplifier in the one optical amplifier units.

14. A system as recited in claim 11, wherein the optical transmitter includes transmitter light sources operating at different wavelengths and optical combining elements to combine outputs from the transmitter light sources into a fiber output coupled to the optical fiber link.

15. A system as recited in claim 14, wherein a transmitter light source includes two lasers having outputs combined in the fiber device, the combined output from the fiber device being transmitted to the optical combining elements.

16. A system as recited in claim 11, wherein the optical receiver includes optical separating elements to separate different wavelengths of light received from the optical fiber link and to direct light at different wavelengths to respective detectors.

17. A system as recited in claim 11, further comprising an optical add/drop multiplexer disposed on the optical fiber link.

* * * * *